106. COMPOSITIONS, COATING OR PLASTIC.

84

No. 830,597. PATENTED SEPT. 11, 1906.
F. KELLEN.
ARTIFICIAL STONE.
APPLICATION FILED MAY 19, 1906.

*Marble chips & dust*
*Talc*
*Ochre*
*Silicate Soda*
*Sulphuric acid*
*Mg. Oxy.*

WITNESSES:
Gustave Dieterich
Edwin H. Dieterich

INVENTOR
Frank Kellen
BY Straley & Washwick
his ATTORNEYS

UNITED STATES PATENT OFFICE.

FRANK KELLEN, OF NEW YORK, N. Y., ASSIGNOR, BY MESNE ASSIGNMENTS, TO MATTHEW E. HERTZ, OF NEW YORK, N. Y.

ARTIFICIAL STONE.

No. 830,597.     Specification of Letters Patent.     Patented Sept. 11, 1906.

Application filed May 19, 1906. Serial No. 317,673.

*To all whom it may concern:*

Be it known that I, FRANK KELLEN, a citizen of the United States, residing at the city of New York, borough of Manhattan, in the county and State of New York, have invented certain new and useful Improvements in Artificial Stone, of which the following is a full, clear, and exact specification.

My invention relates to improvements in artificial stone; and the same has for its object more particularly to provide a solid, durable, and artistic composition adapted for use as a floor-covering, wainscotting, paneling, and for other architectural and structural purposes.

Further, said invention has for its object to provide an artificial stone for the purposes set forth which may be produced in an unlimited number of colors or color combinations and which is further capable of receiving and retaining a high polish or finish.

Further, said invention has for its object the production of an artificial stone which, in addition to possessing the above-mentioned qualities, shall be of the same structural formation throughout and which will not warp or lose shape during the process of drying and hardening.

To the attainment of the above-mentioned objects and ends my invention consists in the composition of matter composed of the following-named ingredients combined in the proportions and in the manner hereinafter set forth and then pointed out in the claims.

Figure 1:
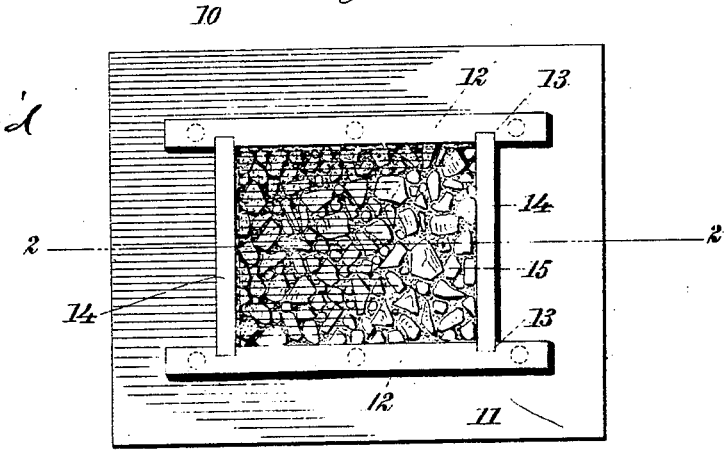
Figure 2:
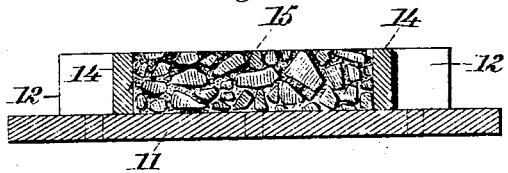
Figure 3:
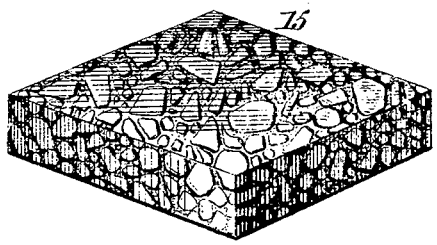

In the accompanying drawings, forming part of this specification, wherein like numerals of reference indicate like parts, Figure 1 is a plan view illustrating one convenient form of apparatus for carrying out my said invention. Fig. 2 is a sectional view of the same, taken on the line 2 2 of Fig. 1; and Fig. 3 is a perspective view showing a piece of artificial stone made according to and embodying my said invention.

In carrying out my invention I take marble-chips, ninety pounds; marble-dust, ten pounds; magnesite, ten pounds; talc, four pounds; ocher, four pounds. Thoroughly mix the same, and then combine the said mixture with enough of a liquid composition consisting of the following-named ingredients to form a plastic body having about the consistency of ordinary cement: chlorid of magnesium, twelve and one-half pounds; silicate of soda, one-half ounce; sulfuric acid, one-half ounce; water, two gallons. The plastic body thus composed partly of the dry and fluid compositions is then pressed into the mold 10 and permitted to dry and harden therein, whereupon the slab or stone is removed and polished as desired in the usual manner by any of the means common in the art.

In the accompanying drawings I have shown a mold 10, consisting of a base 11, made of wood or other suitable material, having the side members 12 12 secured thereon. The opposing surfaces of said side members 12 12 are provided with vertical recesses 13 13, within which are disposed end members 14 14.

15 denotes the composition constituting when dry the artificial stone in position within the mold.

It will of course be understood that any form and style of mold may be employed and that any suitable coloring agent or agents may be incorporated to produce the desired color or combinations of colors in the composition.

Having thus described my invention, what I claim, and desire to secure by Letters Patent, is—

1. The herein-described composition of matter consisting of stone-chips, stone-dust, magnesite, talc, chlorid of magnesium, silicate of soda, sulfuric acid and water, substantially as specified.

2. The herein-described composition of matter consisting of stone-chips, stone-dust, magnesite, talc, chlorid of magnesium, silicate of soda, sulfuric acid, water, and a coloring agent, substantially as specified.

3. The herein-described composition of matter consisting of stone-chips, stone-dust, magnesite, talc, chlorid of magnesium, silicate of soda, sulfuric acid, water and ocher substantially as specified.

4. The herein-described composition of matter consisting of marble-chips, marble-dust, magnesite, talc, chlorid of magnesium, silicate of soda, sulfuric acid, water and a coloring agent, substantially as specified.

5. The herein-described composition of matter consisting of marble-chips (ninety pounds), marble-dust (ten pounds), magnesite (ten pounds), talc (four pounds), ocher (four pounds), chlorid of magnesium (twelve and one-half pounds), silicate of soda (one-half ounce), sulfuric acid (one-half ounce), and water (two gallons) combined as hereinabove set forth.

Signed at the city of New York, borough of Manhattan, in the county and State of New York, this 18th day of May, 1906.

FRANK KELLEN.

Witnesses:
   CONRAD A. DIETERICH,
   HERMAN N. HAUSEN.